US012084915B2

(12) United States Patent
Hsieh et al.

(10) Patent No.: US 12,084,915 B2
(45) Date of Patent: Sep. 10, 2024

(54) WIRELESS ELECTRICALLY-CONTROLLED ELECTRIC CURTAIN

(71) Applicant: CHING FENG HOME FASHIONS CO., LTD., Fuxing Township, Changhua County (TW)

(72) Inventors: Chang-Yu Hsieh, Fuxing Township (TW); Sheng-Ying Hsu, Fuxing Township (TW); Wen-Ying Liang, Fuxing Township (TW)

(73) Assignee: CHING FENG HOME FASHIONS CO., LTD., Fuxing Township (TW)

(*) Notice: Subject to any disclaimer, the term of this patent is extended or adjusted under 35 U.S.C. 154(b) by 172 days.

(21) Appl. No.: 17/886,634

(22) Filed: Aug. 12, 2022

(65) Prior Publication Data

US 2023/0313606 A1 Oct. 5, 2023

(30) Foreign Application Priority Data

Mar. 30, 2022 (TW) .................................. 111112347

(51) Int. Cl.
*E06B 9/322* (2006.01)
*E06B 9/262* (2006.01)
*G08C 17/00* (2006.01)

(52) U.S. Cl.
CPC .............. *E06B 9/322* (2013.01); *E06B 9/262* (2013.01); *G08C 17/00* (2013.01); *E06B 2009/3222* (2013.01); *G08C 2201/93* (2013.01)

(58) Field of Classification Search
CPC .. E06B 2009/3222; E06B 9/322; E06B 9/262; E06B 9/32; G08C 17/00; G08C 2201/93
See application file for complete search history.

(56) References Cited

U.S. PATENT DOCUMENTS

| | | | | |
|---|---|---|---|---|
| 6,369,530 B2 * | 4/2002 | Kovach | E06B 9/32 | 388/933 |
| 8,540,005 B2 * | 9/2013 | Baugh | E06B 9/322 | 160/310 |
| 8,820,388 B2 * | 9/2014 | Mullet | E06B 9/322 | 160/310 |
| 8,830,058 B2 * | 9/2014 | Yeh | A47H 5/0325 | 160/310 |
| 8,950,461 B2 * | 2/2015 | Adams | H04W 52/0245 | 160/1 |

(Continued)

FOREIGN PATENT DOCUMENTS

FR 3109171 A1 * 10/2021 ............. E06B 9/308

*Primary Examiner* — Johnnie A. Shablack
(74) *Attorney, Agent, or Firm* — Birch, Stewart, Kolasch & Birch, LLP

(57) ABSTRACT

An electric curtain includes an upper beam, two curtain ropes, a curtain body and a lower beam. The upper beam includes a rotating shaft, a pivotal member, two rope winders, a controller and a wireless control unit installed inside the controller. The wireless control unit has the technical feature of receiving and matching with a wireless transmission communication protocol originated from the external, thereby allowing the electric curtain to achieve the effect of establishing the most optimal electrical conduction and wireless communication transmission between the two based on the external wireless transmission communication protocol selected and matched.

12 Claims, 6 Drawing Sheets

(56) References Cited

U.S. PATENT DOCUMENTS

| | | | | |
|---|---|---|---|---|
| 9,045,939 | B2 * | 6/2015 | Blair | E06B 9/323 |
| 9,470,040 | B2 * | 10/2016 | Hall | E06B 9/303 |
| 9,599,996 | B2 * | 3/2017 | Lagarde | E05F 15/70 |
| 10,655,386 | B2 * | 5/2020 | Adams | E06B 9/70 |
| 10,781,631 | B2 * | 9/2020 | Huang | E06B 9/68 |
| 10,895,105 | B1 * | 1/2021 | Marchese | E06B 9/322 |
| 11,486,193 | B2 * | 11/2022 | Chiang Huang | E06B 9/322 |
| 11,713,619 | B2 * | 8/2023 | Negrello | E06B 9/322<br>160/168.1 P |
| 11,933,103 | B2 * | 3/2024 | Liang | E06B 9/303 |
| 2012/0073765 | A1 * | 3/2012 | Hontz | E06B 9/304<br>160/331 |
| 2012/0261079 | A1 * | 10/2012 | Chambers | E06B 9/68<br>160/1 |
| 2014/0055061 | A1 * | 2/2014 | Chambers | E06B 9/68<br>315/209 R |
| 2017/0221351 | A1 * | 8/2017 | Watzka | G08C 17/02 |
| 2019/0119978 | A1 * | 4/2019 | Hall | H04L 12/2818 |
| 2021/0238920 | A1 * | 8/2021 | Zhang | H02P 23/18 |
| 2022/0018185 | A1 * | 1/2022 | Thumerel | E06B 9/308 |
| 2022/0085738 | A1 * | 3/2022 | Nien | E06B 9/262 |
| 2022/0333438 | A1 * | 10/2022 | Huang | E06B 9/322 |
| 2023/0019542 | A1 * | 1/2023 | Dupielet | E06B 9/322 |

* cited by examiner

WIRELESS ELECTRICALLY-CONTROLLED ELECTRIC CURTAIN

BACKGROUND OF THE INVENTION

1. Technical Field

The present invention is related to a wireless control technology, and in particular to a wireless electrically-controlled electric curtain.

2. Description of Related Art

Presently, there are curtains equipped with electric motor available in the market, and such electric motor is typically installed on the upper beam or lower beam of the curtain, and a remote controller is also provided to allow users to use the remote controller to electrically controlled the electric motor for operation via the proximity sensing method, in order to achieve the convenience of wireless electric control of the curtain body to collapse upward, to deploy downward or to stop movement. In addition, most of the electric curtains equipped with electric motor in the market typically utilize fixed communication protocol (such as: IR communication protocol, i.e. infrared radiation) for the wireless sensing communication protocol between the remote controller and electric motor, and such communication protocol is built-in inside the electric curtain by default, in order to allow users to use the device directly after installation.

However, there numerous types of wireless communication protocols applied between electric curtain and remote controller in the market (such as: Bluetooth communication transmission protocol, Wi-Fi communication protocol, ZigBee communication protocol or Thread low-power consumption IoT (Internet of Things) communication protocol), and users tend to be confused by such variety of communication protocols during the selection of electric curtain or may even feel inconvenient to understand and to choose products of different communication protocols.

BRIEF SUMMARY OF THE INVENTION

To overcome the drawback described in the preceding description of related art, the present invention provides an electric curtain, comprising a wireless control unit, and having the technical feature of utilizing the wireless control unit capable of receiving and matching with a wireless communication protocol (such as: Bluetooth communication transmission protocol, Wi-Fi communication protocol, ZigBee communication protocol or Thread low-power IoT communication protocol) originated from the external, in order to achieve the technical effect of allowing the electric curtain to establish the most optimal electrical conduction and wireless communication transmission between the electric curtain and the wireless control unit based on the external wireless transmission communication protocol selected and matched.

The electric curtain disclosed by the present invention comprises an upper beam, two curtain ropes, a curtain body and a lower beam. The upper beam comprises a rotating shaft, a pivotal member, two rope winders, a controller and the wireless control unit installed in the controller. The pivotal member is installed at one side of a long axial direction of the upper beam, the controller is installed at another side of the long axial direction of the upper beam and corresponding to a location of the pivotal member, wherein the controller is electrically connected to a microcontrol unit in the pivotal member via a wire, thereby allowing the pivotal member to be electrically controlled by the microcontrol unit in order to generate pivotal movement; one end of the rotating shaft connected to the pivotal member and pivotally rotated by the pivotal member to generate movement, and another end of the rotating shaft sequentially penetrating through hollow tubular rotating members of the two rope winders, thereby allowing the two rotating members to be rotated by the pivotal member in order to further drive the rotating shaft to rotate together; the wireless control unit comprising a microprocessor, an enablement transmission module and a power module; the microprocessor electrically connected to and controlling the enablement transmission module and the power module respectively, and the power module electrically connected to a power supply module of the controller of the upper beam and the enablement transmission module respectively; wherein, the microprocessor of the wireless control unit receives and matches with a wireless transmission communication protocol originated from an external, thereby allowing the microprocessor to generate a movement signal according to the wireless transmission communication protocol for transmitting to the enablement transmission module and to the microcontrol unit electrically connected to the pivotal member via the wire, and allowing the microcontrol unit to control the pivotal member to generate pivotal movement according to the movement signal; a bottom portion of the upper beam having two rope penetrating holes penetrating therethrough and arranged spaced apart from each other, a bottom portion of the lower beam having two installation holes penetrating therethrough and arranged spaced apart from each other, wherein the two rope penetrating holes of the upper beam respectively correspond to locations of the two installation holes of the lower beam, thereby allowing the two rope winders of the upper beam to be correspondingly installed at locations of the two rope penetrating holes of the upper beam respectively; one side of the curtain body installed on the bottom portion of the upper beam, and another side of the curtain body installed on the lower beam; one end of the two curtain ropes respectively fastened to the rotating members of the two rope winders of the upper beam, another end of the two curtain ropes respectively penetrating through the two rope penetrating holes at the bottom portion of the upper beam, the curtain body and the two installation holes of the lower beam, in order to be fastened and secured at the lower beam respectively.

In view of the above, accordingly, with the technical feature that the microprocessor of the wireless control unit of the electric curtain is able to receive and match with the wireless transmission communication protocol originated from the external, the microprocessor generates the movement signal based on the wireless transmission communication protocol for transmitting to the enablement transmission module and to the microcontrol unit electrically connected to the pivotal member via the wire, thereby achieving the technical effect of allowing the microcontrol unit to electrically control the pivotal member to generate pivotal movement according to the movement signal. Accordingly, the pivotal member of the upper beam is electrically controlled by the microcontrol unit to generate pivotal movement in clockwise direction or counterclockwise direction according to the movement signal, and allowing the rotating shaft to generate pivotal movement in clockwise direction or counterclockwise direction together with pivotal rotations of the pivotal member, such that the rotating members of the two rope winders penetrated by the rotating shaft also generate pivotal movement in clockwise direction or counterclockwise direction, thereby allowing the two curtain ropes to drive the curtain body and the lower beam to generate collapsing movement or deployment movement.

DETAILED DESCRIPTION OF THE INVENTION

Figure 1:
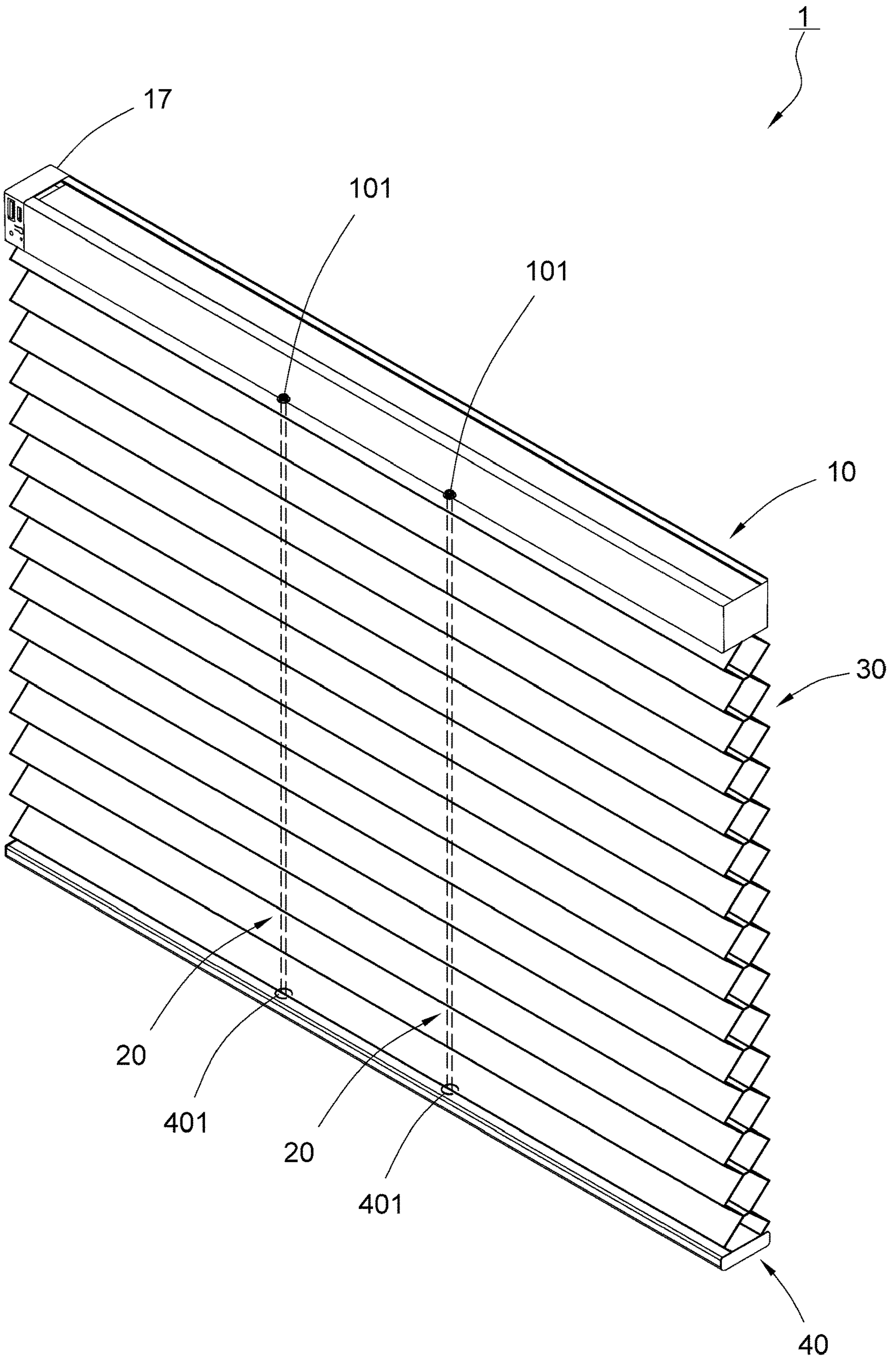
FIG. 1 is a perspective view of a preferred embodiment of the present invention, mainly disclosing an electric curtain under the deployment state.
Figure 2:
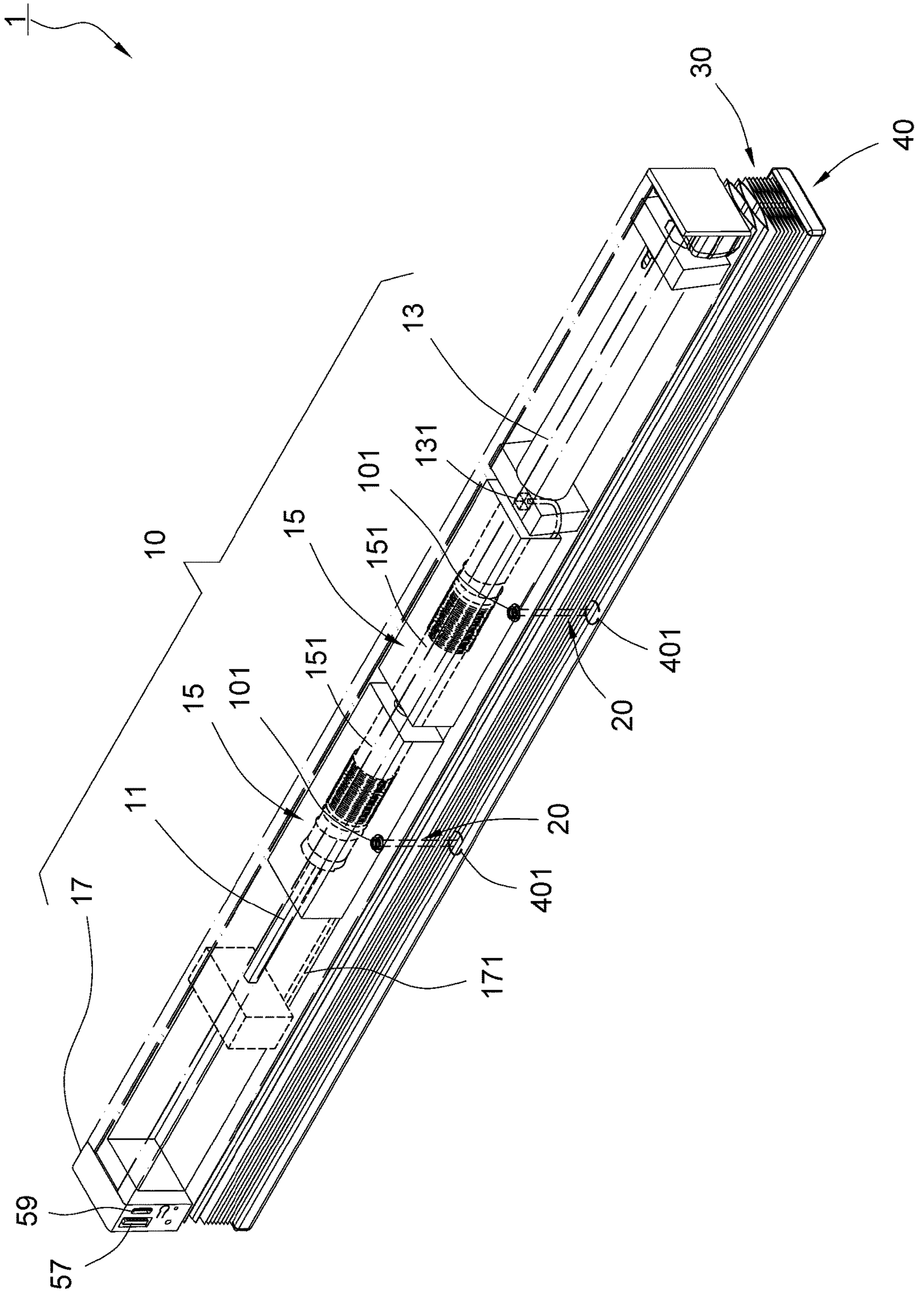
FIG. 2 is a see-through perspective view of partial components similar to FIG. 1, mainly disclosing the electric curtain under the state of stop movement after collapsing.

The applicant emphasizes that for the content of this specification, including the embodiments and the claims described in the following, relevant directional terms shall refer to the directions shown in the drawings descried in the "BRIEF DESCRIPTION OF THE SEVERAL VIEWS OF THE DRAWINGS" in principle. In addition, for the embodiments and drawings described in the following, identical component signs refer to identical or similar components or structural features. In addition, detailed structures, features, assembly or use, manufacturing methods related to the present invention will be described in the subsequent implementation method content in detail. Nevertheless, a person with ordinary skilled in the art in the technical field of the present invention shall understand that the detailed description and specified embodiments of the present invention are provided to support that the present invention can be implemented in practice only such that they shall not be used to limit the scope of the claims of the present invention.

Please refer to FIG. 1 to FIG. 5, showing an electric curtain (the curtain 1 can be, such as, honeycomb shades, or also known as cellular shades; however, the present invention can also be applied to pleated shades, sheer shades or roller shades) disclosed by a preferred embodiment of the present invention, comprising an upper beam 10, two curtain ropes 20, a curtain body 30, a lower beam 40, a wireless control unit 50 and a wireless remote control unit 60.

The upper beam 10 includes a rotating shaft 11, a pivotal member 13, two rope winders 15 and a controller 17, wherein the controller 17 includes a built-in power supply module, which is a known technique, and further detail is omitted hereafter. The bottom portion of the upper beam 10 includes two rope penetrating holes 101 penetrating there through and arranged spaced apart from each other. The bottom portion of the lower beam 40 includes two installation holes 401 penetrating therethrough and arranged spaced apart from each other, wherein the two rope penetrating holes 101 of the upper beam 10 respectively correspond to locations of the two installation holes 401 of the lower beam 40, thereby allowing the two rope winders 15 of the upper beam 10 to be correspondingly installed at locations of the two rope penetrating holes 101 of the upper beam 10 respectively. The pivotal member 13 is installed at one side of a long axial direction of the upper beam 10, and the controller 17 is installed at another side of the long axial direction of the upper beam 10 and corresponding to a location of the pivotal member 13, wherein the controller 17 is electrically connected to a microcontrol unit 131 in the pivotal member 13 via a wire 171, thereby allowing the pivotal member 13 to be electrically controlled by the microcontrol unit 131 in order to generate pivotal movement. One end of the rotating shaft 11 is connected to the pivotal member 13 and pivotally rotated by the pivotal member 13 to generate movement, and another end of the rotating shaft 11 sequentially penetrates through hollow tubular rotating members 151 of the two rope winders 15, thereby allowing the two rotating members 151 to be rotated by the pivotal member 13 in order to further drive the rotating shaft 11 to rotate together.

One side of the curtain body 30 is installed at the bottom portion of the upper beam 10, and another side of the curtain body 30 is installed at the top portion of the lower beam 40. One end of the two curtain ropes 20 is respectively fastened to the rotating members 151 of the two rope winders 15 of the upper beam 10 via a predefined stroke, allowing the two curtain ropes 20 to be driven by the rotating members 151 of the two rope winders 15 in order to be under the roll-up or extension state. Another end of the two curtain ropes 20 respectively penetrates through the two rope penetrating holes 101 at the bottom portion of the upper beam 10, the curtain body 30 and the two installation holes 401 of the upper beam 40, allowing the other end of the two curtain ropes 20 to be fastened and secured at the lower beam 40 respectively.

Please refer to FIG. 2 to FIG. 5. the wireless control unit 50 is installed inside the controller 17 of the upper beam 10. Preferably, the controller 17 of the upper beam 10 further includes an accommodating portion 173 for communicating with the external, and the wireless control unit 50 is received inside the accommodating portion 173 of the controller 17. The wireless control unit 50 can be a printed circuit board having an integrated circuit assembly, an active component electrically connected to a passive component assembly or an integrated system in package (SIP) assembly. The wireless control unit 50 comprises a microprocessor 51, an enablement transmission module 53, a power module 55, a first transmission port 57 and a second transmission port 59. The microprocessor 51 is electrically connected to and controls the enablement transmission module 53, the power module 55, the first transmission port 57 and the second transmission port 59 respectively. In addition, the power module 55 is electrically connected to the built-in power supply module of the controller 17 of the upper beam 10 and the enablement transmission module 53 respectively. The power supply module of the controller 17 supplies the required power to the power module 55 of the wireless control unit 50, and the microprocessor 51 electrically controls the power module 55 to supply power to the enablement transmission module 53; wherein the enablement transmission module 53 of the wireless control unit 50 is electrically connected to and electrically controls the microcontrol unit 131 of the pivotal member 13 via the wire 171 and in a parallel connection method, thereby allowing the pivotal member 13 to be electrically controlled by the microcontrol unit 131 in order to generate pivotal movement in clockwise director or counterclockwise direction; wherein the microprocessor 51 includes a built-in multiplex matching communication protocol algorithm logic used to identify a communication protocol originated from the first transmission port 57 or the second transmission port 59, and to match with the corresponding wireless transmission communication protocol of IR (infrared Radiation) communication protocol, Bluetooth communication transmission protocol (including but not limited to Bluetooth h2.x+EDR, Bluetooth h3.0+HS, Bluetooth 4.x, Bluetooth 5.x or Bluetooth Low Energy), Wi-Fi communication protocol, ZigBee communication protocol, Thread low-power IoT (Internet of Things) communication protocol or NFC (Near Field Communication) communication protocol, in order to use it to achieve the effect of data or signal transmission. It shall be noted that the first transmission port 57 is a USB (Universal Serial Bus) transmission port, and the USB transmission port of the first transmission port 57 complies with the communication standards of USB 2.x+HiSpeed, USB 3.x +Gen x, USB 4.x or Wireless USB. The second transmission port 59 is a USB Type-C transmission port and complies with the communication standard of Wireless USB.

Figure 3:
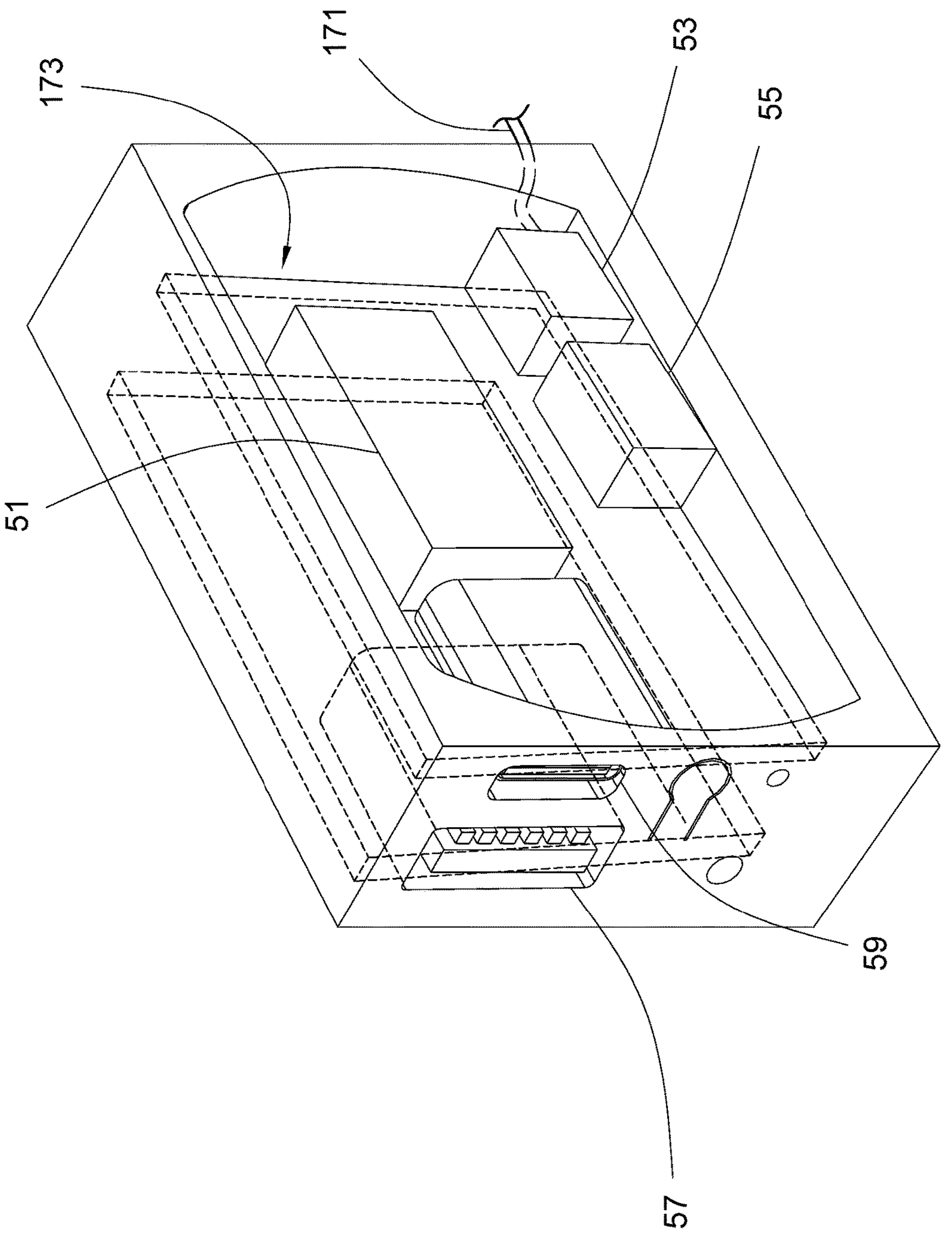
FIG. 3 is an enlarged perspective view of partial components of FIG. 1, mainly disclosing a wireless control unit and its sub-component installation and relative locations of the electric curtain.
Figure 4:
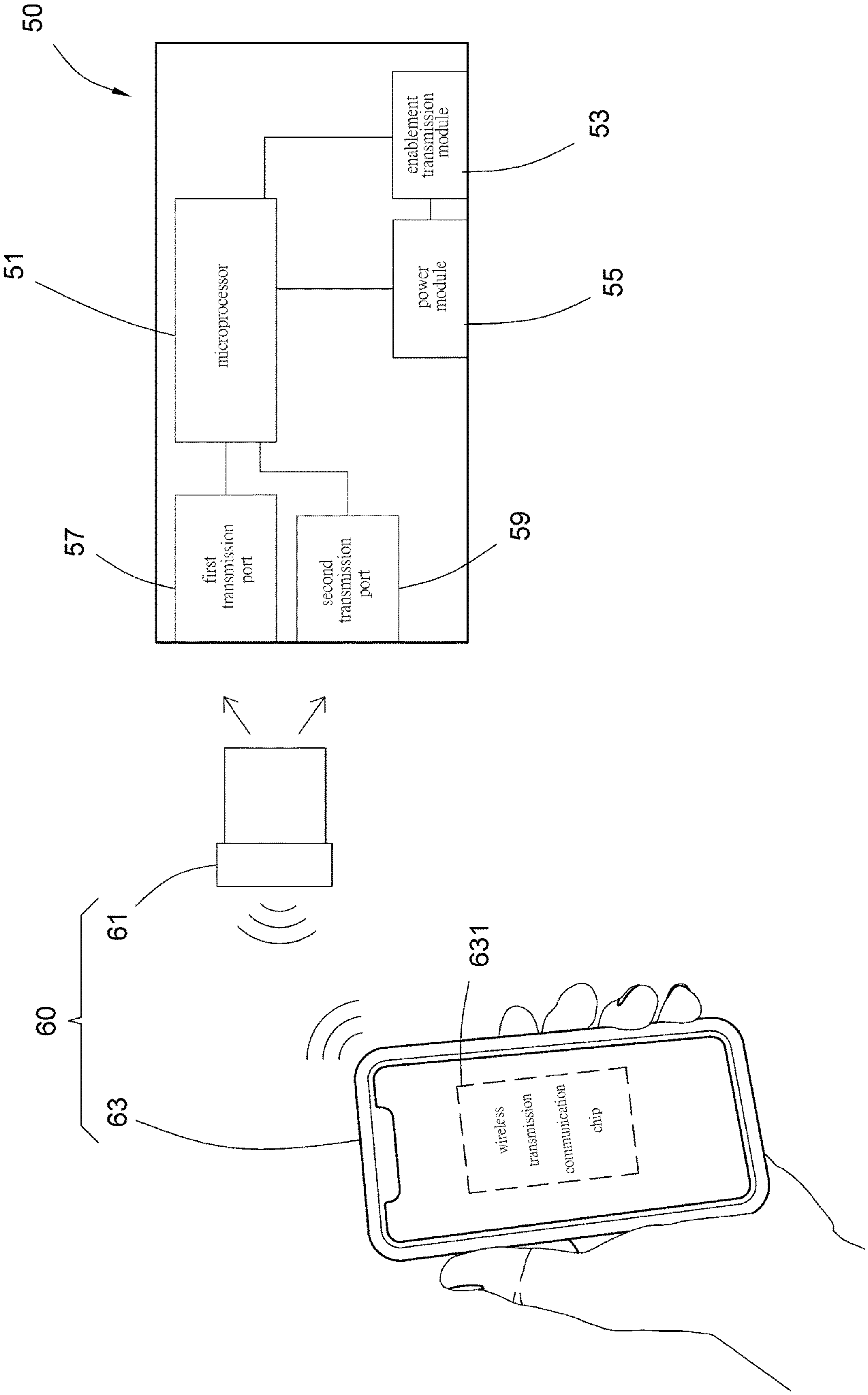
FIG. 4 illustrates a preferred embodiment of the presenting invention disclosing the electric curtain further comprising a wireless remote control unit, and a structural view of the wireless control unit and the wireless remote control unit.

Please refer to FIG. 3 to FIG. 5 again. The wireless remote control unit 60 comprises a transmitter 61 and a remote controller 63, allowing the transmitter 61 to be electrically controlled by the remote controller 63 via wireless method, and to wirelessly transmit a corresponding wireless transmission communication protocol of IR (infrared Radiation) communication protocol, Bluetooth communication transmission protocol (including but not limited to Bluetooth h2.x+EDR, Bluetooth h3.0+HS, Bluetooth 4.x, Bluetooth 5.x or Bluetooth Low Energy), Wi-Fi communication protocol, ZigBee communication protocol, Thread low-power IoT (Internet of Things) communication protocol or NFC (Near Field Communication) communication protocol to the external. It shall be noted that the transmitter 61 can be a USB (Universal Serial Bus) transmission port or a USB Type-C transmission port complying with the Wireless USB standard. The remote controller 63 can be a conventional smartphone or a remote controller or network switch equipment, or smart sound box, etc., equipped with IR (infrared Radiation) communication protocol, wherein the remote controller 63 includes a built-in wireless transmission chip 631 equipped with the multiplex matching technology in order to match with the corresponding wireless transmission communication protocol of IR (infrared Radiation) communication protocol, Bluetooth communication transmission protocol (including but not limited to Bluetooth h2.x+EDR, Bluetooth h3.0+HS, Bluetooth 4.x, Bluetooth 5.x or Bluetooth Low Energy), Wi-Fi communication protocol, ZigBee communication protocol, Thread low-power IoT (Internet of Things) communication protocol or NFC (Near Field Communication) communication protocol. Furthermore, it shall be noted that the multiplex matching communication protocol algorithm logic provided in the microprocessor 51 of the wireless control unit 50 can also be built-in inside the transmitter 61 of the wireless remote control unit 60 depending upon the actual needs, allowing all three of the microprocessor 51 of the wireless control unit 50 and the transmitter 61 of the wireless remote control unit 60 as well as the wireless transmission communication chip 631 of the remote controller 63 to match with the common communication transmission layer of the corresponding wireless transmission communication protocol of IR (infrared Radiation) communication protocol, Bluetooth communication transmission protocol (including but not limited to Bluetooth h2.x+EDR, Bluetooth h3.0+HS, Bluetooth 4.x, Bluetooth 5.x or Bluetooth Low Energy), Wi-Fi communication protocol, ZigBee communication protocol, Thread low-power IoT (Internet of Things) communication protocol or NFC (Near Field Communication) communication protocol, in order to achieve the effect of obtaining greater wireless electrical conduction and transmission between the wireless remote control unit 60 and the wireless control unit 50.

The above describes the technical features of an electric curtain 1 and its components according to a preferred embodiment of the present invention. In the following content, the wireless control unit 50 installed in the upper beam 10 of the electric curtain 1 will be further described, in order to explain how to control the movement of the electric curtain 1 via wireless electrical transmission from the external such that it is able to effectively overcome the problem of the known technology and to further achieve the expected effect of the present invention:

First, please refer to FIG. 1 to FIG. 3 and FIG. 5. The technical features of the first transmission port 57 and the second transmission port 59 of the wireless control unit 50 in the accommodating portion 173 arranged at the controller 17 are utilized to communicate with the external. The transmitter 61 complying with the Wireless USB communication standard of the wireless remote control unit 60 corresponds with the external and is inserted at the location of the first transmission port 57 or the second transmission port 59 of the wireless control unit 50 in the controller 17 of the upper beam 10, allowing the remote controller 63 of the wireless remote control unit 60 to establish electrical conduction with the first transmission port 57 or the second transmission port 59 of the wireless control unit 50 via the transmitter 61, such that the effect of electrical conduction and transmission via wireless method can be achieved between the wireless remote control unit 60 and the wireless control unit 50.

Figure 5:
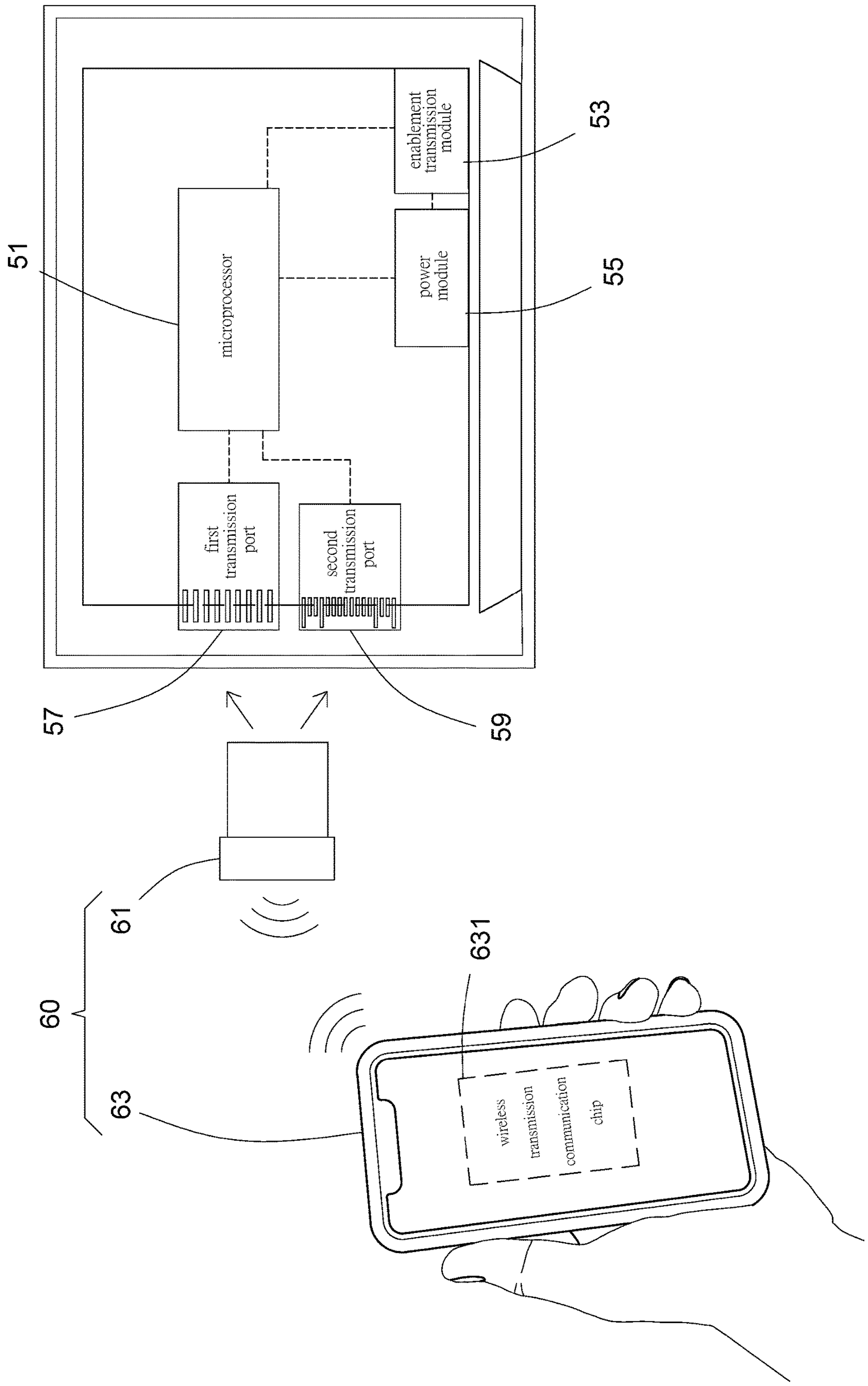
FIG. 5 is a structural view of the wireless control unit and the wireless remote control unit of the electric curtain disclosed in a preferred embodiment of the presenting invention applied to the electric curtain.

Secondly, as shown in FIG. 3 to FIG. 5, the technical feature of a built-in multiplex matching communication protocol algorithm logic of the microprocessor 51 of the wireless control unit 50 is used to identify and match with the corresponding wireless transmission communication protocol of IR (infrared Radiation) communication protocol, Bluetooth communication transmission protocol (including but not limited to Bluetooth h2.x+EDR, Bluetooth h3.0+HS, Bluetooth 4.x, Bluetooth 5.x or Bluetooth Low Energy), Wi-Fi communication protocol, ZigBee communication protocol, Thread low-power IoT (Internet of Things) communication protocol or NFC (Near Field Communication) communication protocol originated from the wireless transmission communication chip 631 of the remote controller 63 of the wireless remote control unit 60, such that the selected wireless transmission communication protocol between the wireless controller 50 in the controller 17 of the upper beam 10 and the wireless remote control unit 60 can be matched, thereby achieving the effect of most optimal electrical conduction and corresponding wireless communication transmission protocol matching. In addition, the multiplex matching communication protocol algorithm logic equipped in the microprocessor 51 of the wireless control unit 50 can also be configured inside the transmitter 61 of the wireless remote control unit 60 depending upon the actual needs.

Similarly, the wireless transmission protocol between the wireless control unit 50 in the controller 17 of the upper beam 10 and the wireless remote control unit 60 at the external can also be matched with the selected wireless transmission protocol, thereby achieving the effect of most optimal electrical conduction and corresponding wireless communication protocol matching.

Thirdly, as show in FIG. 1 to FIG. 5, when the remote controller 63 of the wireless remote control unit 60 generates a collapsing signal, a deployment signal or a stop movement signal, the transmitter 61 and the location of the first transmission port 57 or the second transmission port 59 of the wireless control unit 50 corresponding thereto and electrically inserted, immediately electrically transmits to the microprocessor 51. At this time, the built-in multiplex matching communication protocol algorithm logic of the microprocessor 51 correspondingly generates the technical features of a curtain body upward collapsing signal, a curtain body downward deployment signal or a curtain body stop movement signal according to the collapsing signal, the deployment signal or the stop movement signal respectively. During the same time, the enablement transmission module 53 transmits the curtain body upward collapsing signal, the curtain body downward deployment signal or the curtain body stop movement signal to the microcontrol unit 131 of the pivotal member 13 via the wire 171. The microcontrol unit 131 then drives the pivotal member 13 to generate the movement method of rotation in clockwise, rotation in counterclockwise or to stop movement according to the wireless curtain body upward collapsing signal, the curtain body downward deployment signal or the curtain body stop movement signal. Furthermore, the rotating shaft 11 and the rotating members 151 of the two rope winders 15 are pivotally rotated by the pivotal member 13 to generate rotation in clockwise, rotation in counterclockwise or to stop movement. Moreover, the two curtain ropes 20 also drive the components of the curtain body 30 and the lower beam 40 to generate rotation in clockwise, rotation in counterclockwise or to stop movement together with the rotating members 151 of the two rope winders 15, such that they are able to be under the upward collapsing, downward deployment or stop movement state, thereby achieving the effect of electrically controlling the electric curtain 1 via wireless method to perform upward collapsing, downward deployment or stop movement.

Figure 6:
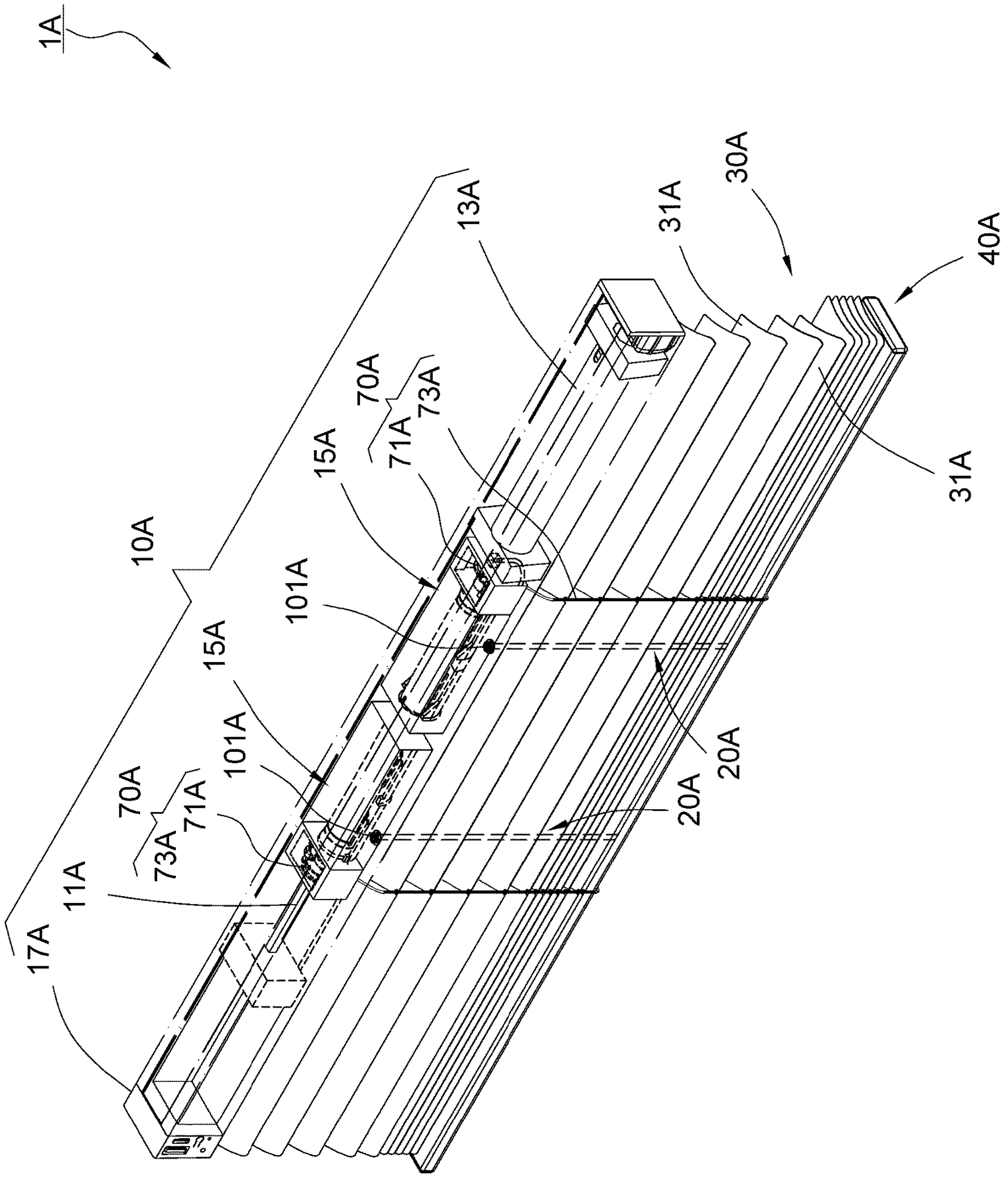
FIG. 6 is a perspective view of another preferred embodiment of the present invention, mainly disclosing another type of electric curtain under the deployment state with turned slats.

Please refer to FIG. 6 showing another type of electric curtain 1A (venetian shades is illustrated as an example), and its main structure and technical features are the same as those of the aforementioned preferred embodiment, and it comprises an upper beam 10A, two curtain ropes 20A, a curtain body 30A formed by a plurality of slats 31A, a lower beam 40A, a wireless control unit, a wireless remote control unit and two turning assemblies 70A. Similarly, the wireless control unit is received inside the accommodating portion of the controller 17A. One end of the two curtain ropes 20A is respectively connected to the two rope winders 15A of the upper beam 10A and is rotated by the two rope winders 15A in order to rotate together, and another end of the two curtain ropes 20A respectively penetrates through the two rope penetrating holes 101A of the upper beam 10A and is connected to the plurality of slats 31A of the curtain body 30A in order to be fastened and secured at the lower beam 40A, thereby allowing the plurality of slats 31A and the curtain body 30A and the lower beam 40A to be rotated by the two rope winders 15A to be under the movement state of upward collapsing, downward deployment or stop movement. Furthermore, any one of the turning assemblies 70A basically formed by a turning member 71A and two turning ropes 73A fastened to the turning member 71A, the turning member 71A of any one of the turning assemblies 70A is arranged at one side of the two rope winders 15A respectively and is penetrated by the rotating shaft 11A of the upper beam 10A sequentially, thereby allowing the turning member 71 of any one of the turning assemblies 70A to be pivotally rotated by the components of the rotating shaft 11A of the upper beam 10A, the pivotal member 13A and the rope winders 15A in order to generate turning movement in clockwise direction or counterclockwise direction. In addition, the electric curtain 1A disclosed in this embodiment mainly utilizes the technical features of one end of the two turning ropes 73A of any one of the turning assemblies 70A being respectively fastened to two opposite sides of the turning member 71A and pivotally rotated by the two rope winders 15A in order to move together, and another end of the two turning ropes 73A of any one of the turning assemblies 70A respectively penetrates through the two rope penetrating holes 101A of the upper beam 10A and is connected to the plurality of slats 31A of the curtain body 30A in order to be secured at the lower beam 40A. Accordingly, for the electric curtain 1A, due to the pivotal movement of the two rope winders 15A, the turning members 71A of the two turning assemblies 70A also generate turning movement in clockwise direction or counterclockwise direction, thereby achieving the effect of allowing the plurality of slats 31A of the curtain body 30A to generate nearly synchronous turning movement in clockwise direction or counterclockwise direction.

What is claimed is:

1. An upper beam (10), applicable for installation on a curtain, the upper beam (10) comprising:

a rotating shaft (11), a pivotal member (13), two rope winders (15), a controller (17) and a wireless control unit (50) arranged at the controller (17);

the pivotal member (13) installed at one side of a long axial direction of the upper beam (10), the controller (17) installed at another side of the long axial direction of the upper beam (10) and corresponding to a location of the pivotal member (13), wherein the controller (17) is electrically connected to a microcontrol unit (131) in the pivotal member (13) via a wire (171), thereby the pivotal member (13) is electrically controlled by the microcontrol unit (131) in order to generate pivotal movement; one end of the rotating shaft (11) connected to the pivotal member (13) and pivotally rotated by the pivotal member (13) to generate movement, and another end of the rotating shaft (11) sequentially penetrating through hollow tubular rotating members (151) of the two rope winders (15), thereby the two rotating members (151) is rotated by the pivotal member (13) in order to further drive the rotating shaft (11) to rotate together;

the wireless control unit (50) comprising a microprocessor (51), an enablement transmission module (53) and a power module (55); the microprocessor (51) electrically connected to and controlling the enablement transmission module (53) and the power module (55) respectively, and the power module (55) electrically connected to a power supply module of the controller (17) of the upper beam (10) and the enablement transmission module (53) respectively;

wherein, the microprocessor (51) of the wireless control unit (50) receives and matches with a wireless transmission communication protocol, thereby the microprocessor (51) of the wireless control unit (50) generates a movement signal according to the wireless transmission communication protocol for transmitting to the enablement transmission module (53) and to the microcontrol unit (131) electrically connected to the pivotal member (13) via the wire (171), and the microcontrol unit (131) controls the pivotal member (13) to generate pivotal movement according to the movement signal;

wherein the microprocessor (51) of the wireless control unit (50) includes a multiplex matching communication protocol algorithm logic used to identify the wireless communication protocol in order to generate the corresponding movement signal, and to further transmit to the enablement transmission module (53) and to the microcontrol unit (131) electrically connected to the pivotal member (13) via the wire (171);

wherein the wireless control unit (50) further comprises a first transmission port (57) and a second transmission port (59), the microprocessor (51) is electrically connected to and controls the first transmission port (57) and the second transmission port (59) respectively; wherein the multiplex matching communication protocol algorithm logic of the microprocessor (51) is used to identify a communication protocol originated from the first transmission port (57) or the second transmission port (59).

2. The upper beam (10) according to claim 1, wherein the controller (17) includes an accommodating portion (173) and the wireless control unit (50) is received inside the accommodating portion (173) of the controller (17).

3. An electric curtain (1), comprising:

an upper beam (10) according to claim 1, two curtain ropes (20), a curtain body (30) and a lower beam (40);

a bottom portion of the upper beam (10) having two rope penetrating holes (101) penetrating therethrough and arranged spaced apart from each other, a bottom portion of the lower beam (40) having two installation holes (401) penetrating therethrough and arranged spaced apart from each other, wherein the two rope penetrating holes (11) of the upper beam (10) respectively correspond to locations of the two installation holes (401) of the lower beam (40), thereby the two rope winders (15) of the upper beam (10) are correspondingly installed at locations of the two rope penetrating holes (101) of the upper beam (10) respectively; one side of the curtain body (30) installed on the bottom portion of the upper beam (10), and another side of the curtain body (30) installed on the lower beam (40);

one end of the two curtain ropes (20) respectively fastened to the rotating members (151) of the two rope winders (15) of the upper beam (10), another end of the two curtain ropes (20) respectively penetrating through the two rope penetrating holes (101) at the bottom portion of the upper beam (10), the curtain body (30) and the two installation holes (401) of the lower beam (40), in order to be fastened and secured at the lower beam (40) respectively;

wherein the pivotal member (13) of the upper beam (10) is electrically controlled by the microcontrol unit (131) to generate pivotal movement in clockwise direction or counterclockwise direction, and the rotating shaft (11) generates pivotal movement in clockwise direction or counterclockwise direction together with pivotal rotations of the pivotal member (13), such that the rotating members (151) of the two rope winders (15) penetrated by the rotating shaft (11) also generate pivotal movement in clockwise direction or counterclockwise direction, thereby the two curtain ropes (20) drives the curtain body (30) and the lower beam (40) to generate collapsing movement or deployment movement.

4. The electric curtain (1) according to claim 3, further comprising a wireless remote control unit (60) comprising a transmitter (61) and a remote controller (63), the transmitter (61) correspondingly and electrically inserted at a location of the first transmission port (57) or the second transmission port (59) of the wireless control unit (50) of the controller (17) of the upper beam (10), and the transmitter (61) wirelessly and electrically controlled by the remote controller (63), thereby the remote controller (63) of the wireless remote control unit (60) establishes an electric transmission wirelessly with the microprocessor (51) via the first transmission port (57) or the second transmission port (59).

5. The electric curtain (1) according to claim 3, wherein the remote controller (63) of the wireless remote control unit (60) includes a wireless transmission communication chip (631) for generating a collapsing signal, a deployment signal or a stop movement signal for electrically transmitting to the microprocessor (51) via the transmitter (61) and the first transmission port (57) or the second transmission port (59) of the wireless control unit (50), the multiplex matching communication protocol algorithm logic of the microprocessor (51) generates a curtain body upward collapsing signal, a curtain body downward deployment signal or a curtain body stop movement signal according to the collapsing signal, the deployment signal and the stop movement signal respectively, for electrically transmitting to the enablement transmission module (53) and to the microcontrol unit (131) of the pivotal member (13) via the wire (171), thereby the pivotal member (13) is electrically controlled by the microcontrol unit (131) to generate pivotal movement in clockwise direction, to generate pivotal movement in counterclockwise direction or to stop movement.

6. The electric curtain (1) according to claim 3, wherein the multiplex matching communication protocol algorithm logic of the microprocessor (51) of the wireless control unit (50) and the wireless transmission communication chip (631) of the remote controller (63) of the wireless remote control unit (60) are configured to correspondingly match with the wireless transmission communication protocol of any one of the types of IR communication protocol, Bluetooth communication transmission protocol, Wi-Fi communication protocol, ZigBee communication protocol, Thread low-power IoT communication protocol and NFC communication protocol, thereby the wireless control unit (60) and the wireless remote control unit (50) perform electric conduction and transmission wirelessly therebetween.

7. The electric curtain (1) according to claim 3, wherein the transmitter (61) of the wireless remote control unit (60) includes the multiplex matching communication protocol algorithm logic, thereby the microprocessor (51) of the wireless control unit (50) and the transmitter (61) of the wireless remote control unit (60), the wireless transmission communication chip (631) of the remote controller (63) correspondingly match with the wireless transmission communication protocol of any one of the types of IR communication protocol, Bluetooth communication transmission protocol, Wi-Fi communication protocol, ZigBee communication protocol, Thread low-power IoT communication protocol and NFC communication protocol via the multiplex matching communication protocol algorithm logic, thereby the wireless control unit (60) and the wireless remote control unit (50) [to]] perform electric conduction and transmission wirelessly therebetween.

8. An electric curtain (1A), comprising:

an upper beam (10A) according to claim 1, two curtain ropes (20A), a curtain body (30A), a lower beam (40A) and two turning assemblies (70A);

a bottom portion of the upper beam (10A) having two rope penetrating holes (101A) penetrating therethrough and arranged spaced apart from each other, thereby the two rope winders (15A) of the upper beam (10A) is correspondingly installed at locations of the two rope penetrating holes (101A) of the upper beam (10A) respectively;

one end of the two curtain ropes (20A) respectively fastened to the rotating members (151A) of the two rope winders (15A) of the upper beam (10A), another end of the two curtain ropes (20A) respectively penetrating through the two rope penetrating holes (101A) of the upper beam (10A) and connected to a plurality of slats (31A) of the curtain body (30A) in order to be fastened and secured at the lower beam (40A) respectively;

any one of the turning assemblies (70A) comprising a turning member (71A) and two turning ropes (73A) fastened to the turning member (71A), the turning member (71A) of any one of the turning assemblies (70A) arranged at one side of one of the rope winders (15A) of the upper beam (10A), and penetrated by the rotating shaft (11A) of the upper beam (10A) sequentially, one end of the two turning ropes (73A) respectively fastened to two opposite sides of the turning member (71A) and pivotally rotated by the two rope winders (15A) to move together, another end of the two turning ropes (73A) respectively penetrating through the two rope penetrating holes (101A) of the upper beam (10A) and connected to the plurality of slats (31A) of the curtain body (30A) in order to be secured at the lower beam (40A);

wherein the pivotal member (13A) of the upper beam (10A) is electrically controlled by the microcontrol unit (131A) to generate pivotal movement in clockwise direction or counterclockwise direction, and thereby the rotating shaft (11A) generates pivotal movement in clockwise direction or counterclockwise direction together with pivotal rotations of the pivotal member (13A), such that the rotating members (151A) of the two rope winders (15A) penetrated by the rotating shaft (11A) and the turning members (71A) of the two turning assemblies (70A) also generate pivotal movement in clockwise direction or counterclockwise direction, thereby the two curtain ropes (20A) [to]] drive the curtain body (30A) and the lower beam (40A) to collapse or to deploy, and the plurality of slats (31A) of the curtain body (30A) turns in clockwise direction or counterclockwise direction.

9. The electric curtain (1) according to claim 8, further comprising a wireless remote control unit (60) comprising a transmitter (61) and a remote controller (63), the transmitter (61) correspondingly and electrically inserted at a location of the first transmission port (57) or the second transmission port (59) of the wireless control unit (50) of the controller (17) of the upper beam (10), and the transmitter (61) wirelessly and electrically controlled by the remote controller (63), thereby the remote controller (63) of the wireless remote control unit (60) establishes an electric transmission wirelessly with the microprocessor (51) via the first transmission port (57) or the second transmission port (59).

10. The electric curtain (1) according to claim 8, wherein the remote controller (63) of the wireless remote control unit (60) includes a wireless transmission communication chip (631) for generating a collapsing signal, a deployment signal or a stop movement signal for electrically transmitting to the microprocessor (51) via the transmitter (61) and the first transmission port (57) or the second transmission port (59) of the wireless control unit (50), the multiplex matching communication protocol algorithm logic of the microprocessor (51) generates a curtain body upward collapsing signal, a curtain body downward deployment signal or a curtain body stop movement signal according to the collapsing signal, the deployment signal and the stop movement signal respectively, for electrically transmitting to the enablement transmission module (53) and to the microcontrol unit (131) of the pivotal member (13) via the wire (171), thereby the pivotal member (13) to be electrically controlled by the microcontrol unit (131) generates pivotal movement in clockwise direction, to generate pivotal movement in counterclockwise direction or to stop movement.

11. The electric curtain (1) according to claim 8, wherein the multiplex matching communication protocol algorithm logic of the microprocessor (51) of the wireless control unit (50) and the wireless transmission communication chip (631) of the remote controller (63) of the wireless remote control unit (60) are configured to correspondingly match with the wireless transmission communication protocol of any one of the types of IR communication protocol, Bluetooth communication transmission protocol, Wi-Fi communication protocol, ZigBee communication protocol, Thread low-power IoT communication protocol and NFC communication protocol, thereby the wireless control unit (60) and the wireless remote control unit (50) perform electric conduction and transmission wirelessly therebetween.

12. The electric curtain (1) according to claim 8, wherein the transmitter (61) of the wireless remote control unit (60) includes the multiplex matching communication protocol algorithm logic, thereby the microprocessor (51) of the wireless control unit (50) and the transmitter (61) of the wireless remote control unit (60), the wireless transmission communication chip (631) of the remote controller (63) correspondingly match with the wireless transmission communication protocol of any one of the types of IR communication protocol, Bluetooth communication transmission protocol, Wi-Fi communication protocol, ZigBee communication protocol, Thread low-power IoT communication protocol and NFC communication protocol via the multiplex matching communication protocol algorithm logic, thereby the wireless control unit (60) and the wireless remote control unit (50) performs electric conduction and transmission wirelessly therebetween.

* * * * *